Dec. 9, 1969     A. R. SEDGEBEER     3,482,719

TIRE LIFTER

Filed June 18, 1968

INVENTOR:
ALBERT ROBERT SEDGEBEER
BY
Elliott & Pastoriza
ATTORNEYS

United States Patent Office 3,482,719
Patented Dec. 9, 1969

3,482,719
TIRE LIFTER
Albert Robert Sedgebeer, 5127 Elmdale Drive,
Rolling Hills Estates, Calif. 90274
Filed June 18, 1968, Ser. No. 737,899
Int. Cl. B60b 29/00
U.S. Cl. 214—332                    10 Claims

ABSTRACT OF THE DISCLOSURE

A mobile tire lifter includes a seat structure on which a mechanic or operator can remain seated as vehicle tires or wheel assemblies are quickly removed or replaced. The seat structure is coupled to the rearward end of an elongated lever that is connected at its forward end to a tire support arranged to slip beneath the tire. Lifting force is exerted on the tire by the tire support in response to the mechanic's weight being applied to the seat. The fulcrum point for the lever may be adjusted to accomodate mechanics and tires of varying weights.

---

This invention relates to apparatus for lifting vehicle tires and wheel assemblies and more specifically to a mobile tire lifter on which a mechanic remains seated as he removes, services, and replaces tires or wheel assemblies.

Background of the invention

Most of the present day service station or repair shop practices for servicing tires and wheel assemblies of automobiles and trucks require the mechanic to perform considerable back-breaking, fatiguing maneuvers.

For example, a conventional practice for packing wheel bearings, after the pertinent wheel assembly has been jacked up, requires the mechanic to loosen the spindle cotter pin and other standard connections and remove the wheel assembly while remaining in a stooped or crouched position. The wheel assembly is heavy and awkward and often slips from its mounting permitting it to fall upon and bruise the toes or fingers of the mechanic. When the wheel assemblies are especially bulky and heavy such as those arranged on heavy-duty trucks, two or more mechanics may be required to jointly remove the wheel assembly which is still time consuming and very costly from both an efficiency and labor standpoint.

In order to remount the tire or wheel assembly it must be carefully hoisted to the proper elevation and maintained in a suspended condition by the mechanic until properly angularly oriented and matched with the mounting components. Thereafter, the tire can then be firmly coupled to its mounting. During this time consuming and laborous operation, the mechanic runs the risk of becoming injured by having his fingers pinched or jammed or his feet crushed and as he expends more energy and becomes tired the risk of injury becomes correspondingly greater.

Sometimes tires or wheel assemblies are removed as the vehicle is maintained in an elevated position by a vehicle hydraulic lift. The mechanic stands underneath the vehicle and is forced to look upwardly and reach the components that must be serviced. It is also tiring when one is required to stand on his feet for long periods of time. Relatively few of these opeartions can be achieved in a given work day because they are fatiguing and generally unpleasant.

Brief summary of the invention

Briefly stated, the present invention provides a mobile tire lifter that can be easily maneuvered by a mechanic or operator to assist him in removing and replacing vehicle tires or wheel assemblies that have been slightly raised or jacked up from the ground. The tire lifter includes a frame for rigidifying the lifter and a seat structure connected to the frame for moving substantially vertically in reaction to the operator's full or partial weight. A tire support positioned in front of the seat structure is arranged for movement beneath the raised tire to exert a lifting pressure on it. Linkage means connect the seat structure and tire support so that when the tire support is extended beneath the tire to be removed and the operator applies a downward force against the seat structure, the linkage means quickly lifts the tire support against the tire enabling the tire to be removed as the operator remains seated.

In accordance with one construction, the linkage means is an elongated lever adjustably coupled to a fulcrum element at a fulcrum point located between the tire support and seat structure. Fulcrum position adjusting means is included for shifting the fulcrum point so as to accommodate mechanics and tires of varying weights. In the case of a relatively heavy mechanic or relatively light tire, the fulcrum point may be shifted to an extreme rearward location close to the seat structure, and in the opposite situation where the mechanic is relatively light or where the tire is relatively heavy, the fulcrum point is shifted to an extreme forward location along the lever.

Preferably the tire support includes a pair of laterally spaced rollers arranged to make rolling contact with the bottom of the tire so that the mechanic may easily rotate the tire for purposes of servicing or alignment. Also the tire support may be swivelly connected to the forward end of the lever thereby permitting the mechanic to rotate a wheel assembly upon a vertical axis in order to service both sides of the wheel assembly while still remaining seated. The tire lifter is preferably mounted on three rotatable elements, two of which are widely spaced apart at the front end of the tire lifter while the other is located at the rear end of the tire lifter.

Brief description of the drawings

The numerous benefits and unique aspects of the present invention will be fully understood when the following detailed description is studied in conjunction with the drawings, in which.

Detailed description of the preferred embodiment

Figure 1:
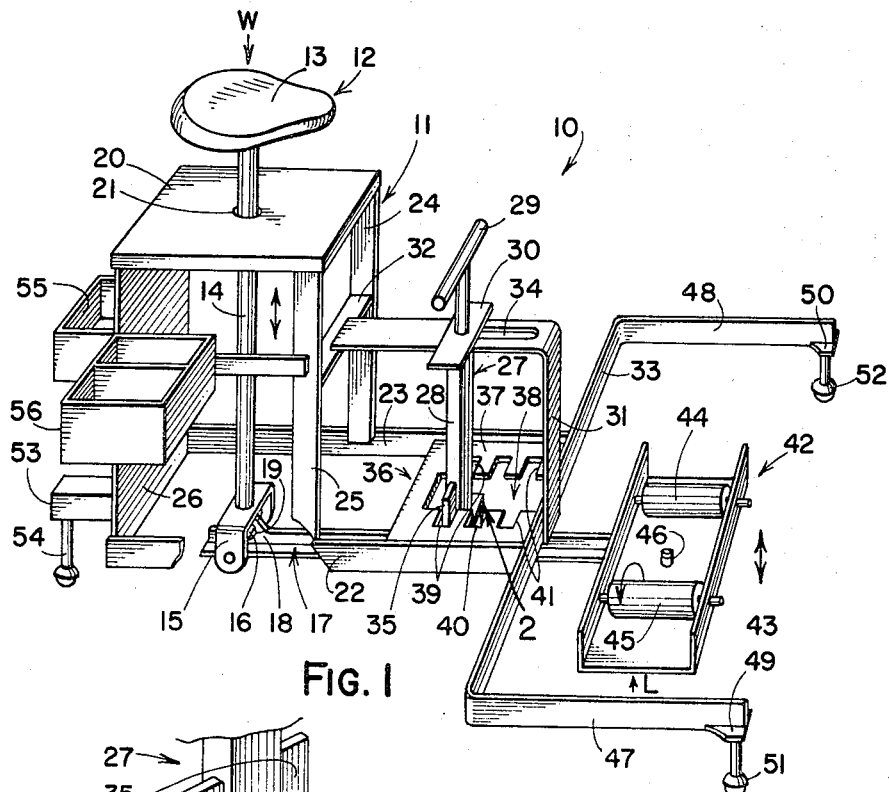
FIGURE 1 is a perspective view partly broken away showing the tire lifter of the present invention.

Referring now to FIGURE 1, a tire lifter 10 is illustrated which can be used to greatly facilitate a mechanic or operator in removing and replacing tires or wheel assemblies while he remains in a seated position. Tire lifter 10 includes an open support frame 11. A vertically adjustable seat structure 12 has a seat 13 for supporting the mechanic and a seat rod 14 connected at its upper end to seat 13. As shall be fully explained, the amount of vertical displacement by seat structure 12 is directly regulated by the amount of weight W that the mechanic exerts upon seat 13. The lower end of seat rod 14 is coupled to a yoke 15 in which a pivot pin 16 is journalled.

Seat structure 12 is connected to linkage means in the form of an elongated connecting rod or lever 17 that is generally disposed beneath frame 11. Lever 17 is of inverted T shape in cross section and a part of its web is enlarged to constitute a flange 18 having an opening 19 through which pivot pin 16 extends.

Directly beneath seat 13 is a platform 20 whose opposing sides are straddled by the mechanic as the tire lifter 10 is being operated. A guide passage 21 formed in the middle of platform 20 maintains seat rod 13 in substantial vertical alignment. A pair of horizontal stringers 22 and 23 attached to the lower ends of a pair of vertical columns 24 and 25 and a rigid back plate 26 coact to fix platform 20 in the desired position.

Connected at an intermediate point of lever 17 is an elongated fulcrum element 27 including a substantially vertically aligned fulcrum rod 28. The top section of fulcrum element 27 has a handle 29 that can be easily reached by the mechanic when seated upon seat 13. Fixed to rod 28 below handle 29 is a laterally extending stop plate 30 which, during the operation of tire lifter 10, rests upon a horizontal section of a positioning bar 31. The rearward end of positioning bar 31 is secured to a cross beam 32 and the lower forward section of positioning bar 31 is rigidly fixed to a stabilizing beam 33. Positioning bar 31 is formed with a longitudinally extending positioning slot 34 whose function will later be described.

A pair of lateral projections 35 (only one of which is shown in FIGURE 1) is formed on the lower end of fulcrum rod 28. Projections 35 cooperate with a fulcrum position adjusting means 36 to regulate the amount of force that the mechanic can transmit through lever 17. Fulcrum position adjusting means 36 includes a horizontal plate 37 formed through its center with an opening 38 that defines a plurality of laterally opposed pairs of slots 39, 40 and 41 horizontally spaced along a direction parallel to the lever longitudinal axis.

Arranged forwardly of fulcrum position adjusting means 36 is a tire support 42 having a dolly or tray 43. A pair of laterally spaced rollers 44 and 45 are journalled in the side walls of dolly 43. The rollers are sufficiently spaced to enable a tire or wheel assembly to be cradled therein and manually rotated about its axis so that the mechanic can quickly angularly orient the tire relative to its corresponding vehicle mounting structure. Tire support 42 may be swiveled on a swivel pin 46 connected to the forward end of lever 17. Thus, when a wheel assembly, for example, is resting on rollers 44 and 45 either side can be serviced by the mechanic who simply manually swivels tray 43 to the desired position.

Stabilizing beam 33 includes a pair of forwardly extending arms 47 and 48 separated by a distance exceeding the width of tire support 42. The forward ends of arms 47 and 48 extend beyond the forward most portion of tire support 42. Arms 47 and 48 terminate at their forward ends in flanges 49 and 50 for mounting a pair of rotatable supports 51 and 52 such as casters. Arms 47 and 48 may be pushed under the vehicle to act as outriggers for balancing tire lifter 10 when a lifting force L is being exerted on dolly 43 to lift a tire or wheel assembly from its mounting.

Attached to the lower end of rigid plate 26 is a mounting block 53 for mounting a rotatable support 54 that may be the same as rotatable supports 51 and 52. Arranged rearwardly and to one side of frame 11, respectively, are a unitary tool tray 55 and a compartmentalized tool tray 56 for conveniently carrying wrenches, cleaning rags, brake packing material, brake lining material and so forth.

Figure 2:
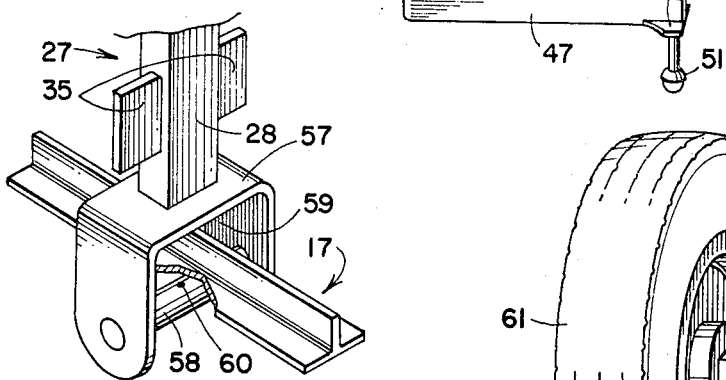
FIGURE 2 is a perspective fragmentary view showing a portion of the tire lifter looking in the direction of the arrow 2 of FIGURE 1.

Referring now to FIGURE 2 it can be seen that the lower end of fulcrum rod 28, immediately below projections 35, is rigidly fixed to a yoke 57. A pin journalled within yoke 57 extends beneath lever 17 to assist in establishing a guideway 59. The point 60 where lever 17 and pin 58 make mutual contact is a fulcrum point for lever 17.

Figure 3:
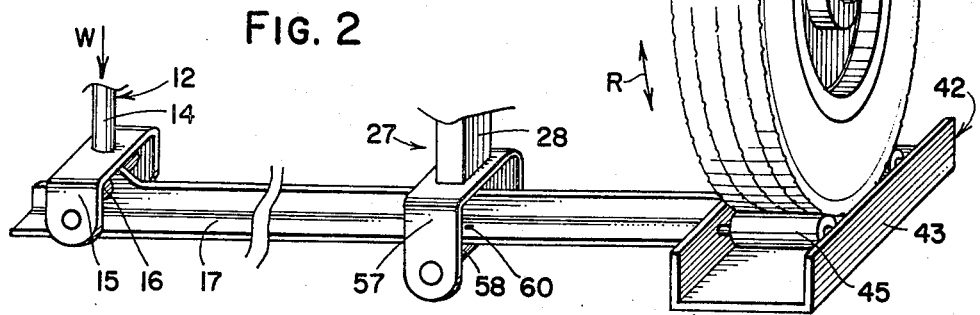
FIGURE 3 is a perspective view of various linkage components in the structure of FIGURE 1 useful in explaining the operation of the invention.

Referring to FIGURE 3 it will now be explained how the mechanic or operator can lift a tire or wheel assembly 61. After estimating the weight of a tire 61 that is to be removed and serviced, the mechanic shifts fulcrum element 27 within fulcrum position adjusting means 36 (shown in FIGURE 1) so that the projections 35 become locked in the appropriate pair of slots, either 39, 40 or 41. The fulcrum point 60 thus becomes adjusted to the ideal location to facilitate the mechanic in lifting tire 61.

It will be appreciated that when a fixed weight W is applied to seat structure 12, the resulting lifting force L that can be exerted by tire support 42 will depend upon the relative location of fulcrum point 60. If the mechanic is relatively light or alternatively if the tire is relatively heavy and therefore a great lifting force L is required, the mechanic merely pulls handle 29 upwardly, slides fulcrum rod 28 forwardly through slot 34 and then drops projections 35 into slots 41. By shifting the fulcrum point as forwardly as possible, the maximum lifting force L can be achieved. If, however, the mechanic is relatively heavy or the tire to be lifted is relatively light and therefore only a minimum amount of lifting force L is required, the fulcrum point is moved back as far as possible so that projection 35 will be locked in slots 39. When weight W is applied to seat structure 12, the section of lever 17 to the left of fulcrum element 27 will become lowered and the portion of lever 17 to the right of fulcrum element 27 will be raised causing a concomitant lifting force L upon dolly 43.

Operation

Keeping the above construction in mind it can be understood how many of the previously described disadvantages of prior art tire lifting techniques are overcome or substantially eliminated by the present invention.

After the vehicle whose tire or wheel assembly is to be serviced is slightly raised or jacked up from the ground, the mechanic or operator is prepared to use tire lifter 10 to his great advantage. The mechanic estimates the tire or wheel assembly weight and then manipulates fulcrum element 27 so as to shift fulcrum point 60 to a relative longitudinal position on elongated lever 17 that will correspond with the necessary and optimum lifting force L. He then sits upon seat 13 with his legs straddled over opposing sides of support frame 11 and proceeds to advance tire lifter 10 by paddling his feet against the ground. Handle 29 may be grasped to steer tire lifter 10 and guide dolly 43 beneath the tire or wheel assembly as arms 47 and 48 are extended beneath the vehicle to assist in stabilizing lifter 10 during the tire removal operation.

With dolly 43 perfectly oriented beneath the tire or wheel assembly that has been previously partially loosened from its mounting the mechanic applies his full or partial weight W upon seat 13 which automatically causes seat rod 14 to push yoke 15 and the adjacent portion of lever 17 downwardly. This automatically results in an upward motion by tire support 42 which lifts tire or wheel assembly 61 from its mounting with a lifting force L as tire lifter 10 is being retracted from the vehicle.

If the tire is flattened and must be fixed, the mechanic, still in a sitting position, paddles tire lifter 10 to a location where the tire may be loaded onto a conventional tire fixing device. After the tire is fixed it is returned to its corresponding vehicle mounting. The mechanic can easily modify the amount of his weight applied to seat 13 until tire 61 is vertically aligned with its mounting. Then tire 61 may be rotated clockwise or counterclockwise as indicated by the arrow R until the lug openings and lugs or the like are arranged in perfect registering relationship. Tire 61 is then pressed back into place and tightened, necessitating minimal effort by the mechanic.

When an entire wheel assembly is removed to have its bearings packed on opposing sides, for example, the mechanic's operation is similar except that after the outer side of the wheel assembly is serviced the mechanic may swivel the wheel assembly around to face him where he can then service the inner side of the wheel assembly. As opposing sides of the wheel assembly are being serviced, the mechanic may lean the wheel assembly against the vehicle or another convenient object while remaining seated.

It can now be seen that because a mechanic can perform numerous service operations on a tire or wheel assembly while sitting down, strain, exhaustion and risk of injury that have long been characteristic of prior art techniques are substantially fully overcome. As a consequence a mechanic can do a more efficient and prompt job.

From the foregoing it will be evident that the present invention has provided a highly versatile and maneuverable tire lifter in which all of the various advantages are fully realized.

What is claimed is:

1. A tire lifter for assisting an operator in removing and replacing vehicle tires that are slightly raised from a support surface, comprising:
   (a) a frame;
   (b) a seat structure coupled to the frame for moving substantially vertically in reaction to the operator's weight;
   (c) a tire support positionable beneath a raised tire to exert lifting pressure on the tire; and
   (d) linkage means interconnecting the seat structure and tire support such that when the tire support is positioned beneath the tire and downward force is applied on the seat structure by the operator, the linkage means raises the tire support against the tire with sufficient lifting force to enable the operator to handle the tire while remaining seated on the seat structure.

2. The structure according to claim 1, wherein the linkage means includes:
   (a) an elongated lever connected to the tire support and seat structure; and
   (b) a fulcrum element supported by said frame and connected to the lever at a fulcrum point between the tire support and seat structure such that downward movement of the lever portion near the seat structure results in upward movement of the lever portion near the tire support.

3. The structure according to claim 2, including fulcrum position adjusting means for varying the lifting force of the tire support in reaction to a given downward force applied to the seat structure.

4. The structure according to claim 3, wherein the fulcrum element is elongated and aligned substantially vertically, the lower end thereof terminates in a guideway for supporting the lever, said lower end including above said guideway a pair of lateral projections; and in which
   the fulcrum position adjusting means includes an horizontal plate on said frame formed with a plurality of laterally opposed pairs of slots horizontally spaced along a direction parallel to the lever longitudinal axis,
   so that when the fulcrum element is positioned with its lateral projections located in a pair of said slots closest to the seat structure, less lifting force is transmitted to the tire support than when the fulcrum element is positioned with its projections in pair of slots closest to the tire support.

5. The structure according to claim 1, wherein the tire support is swivelly connected to the linkage means so that when a tire is lifted by the tire support it may be swiveled about a vertical axis to permit the operator to service both sides of the tire.

6. The structure according to claim 5, wherein the tire support has a pair of laterally spaced rollers arranged so that when the tire is positioned on the rollers it may be rotated about its axis.

7. The structure according to claim 1, wherein the frame includes a stabilizing beam formed with arms aligned on opposite sides of the tire support, the arms being spaced apart by a greater distance than the width of the tire support and extending forwardly of the front edge of the tire support.

8. The structure according to claim 7, wherein:
   the arms are supported on rotatable elements,
   the rearward end of the frame is supported on a rotatable element, and,
   plural tool trays are attached to the frame for containing tools and equipment to be used by the operator.

9. A tire lifter for assisting an operator in removing and replacing vehicle tires that are slightly raised from a support surface, comprising:
   (a) a frame;
   (b) a seat structure connected to the frame for moving substantially vertically in reaction to the operator's weight;
   (c) a tire support movable beneath a raised tire to exert lifting pressure on the tire, the tire support having a pair of laterally spaced rollers arranged so that when the tire is positioned on the rollers it may be rotated about its axis;
   (d) an elongated lever for pivotally mounting the seat structure at one point and swivelly mounting the tire support at another point;
   (e) a fulcrum element supported by said frame and connected to the lever at a fulcrum point between the tire support and seat structure;
   (f) fulcrum position adjusting means for shifting the fulcrum point along the lever to vary the lifting force of the tire support
      so that when the tire support is extended beneath the tire and downward force is applied on the seat structure by the operator, the lever raises the tire support against the tire with sufficient lifting force to enable the operator to handle the tire while remaining seated on the seat structure.

10. The structure according to claim 9, wherein
    the fulcrum element is elongated and aligned substantially vertically, the lower end thereof terminating in a guideway for supporting the lever said lower end including above said guideway a pair of lateral projections; and in which
    the fulcrum position adjusting means includes an horizontal place on said frame formed with a plurality of laterally opposed pairs of slots horizontally spaced along a direction to the lever longitudinal axis, so that when the fulcrum element is positioned with its lateral projections located in a pair of slots closest to the seat structure, less lifting force is transmitted to the tire support than when the fulcrum element is positioned with its projectons in a pair of slots closest to the tire support; and
    a stabilizing means connected to the frame, and including arms positioned in spaced apart relationship on opposite sides of the tire support and extending forwardly of the front edge of the tire support.

References Cited

UNITED STATES PATENTS

| | | | |
|---|---|---|---|
| 2,570,587 | 10/1951 | None et al. | 214—332 |
| 2,640,615 | 6/1953 | Wedel | 214—332 |

HUGO O. SCHULZ, Primary Examiner